(12) United States Patent
Yoshitomi et al.

(10) Patent No.: US 12,487,687 B2
(45) Date of Patent: Dec. 2, 2025

(54) INPUT DEVICE CONTROL SYSTEM AND INPUT DEVICE CONTROLLING METHOD

(71) Applicant: Lenovo (Singapore) Pte. Ltd., Singapore (SG)

(72) Inventors: Keiichi Yoshitomi, Kanagawa (JP); Mitsuhiro Yamazaki, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/766,987

(22) Filed: Jul. 9, 2024

(65) Prior Publication Data

US 2025/0021173 A1 Jan. 16, 2025

(30) Foreign Application Priority Data

Jul. 13, 2023 (JP) .................................. 2023-115125

(51) Int. Cl.
*G06F 3/0354* (2013.01)
*G06F 3/01* (2006.01)
*G06F 3/16* (2006.01)

(52) U.S. Cl.
CPC .......... *G06F 3/03545* (2013.01); *G06F 3/016* (2013.01); *G06F 3/16* (2013.01)

(58) Field of Classification Search
CPC ......... G06F 3/03545; G06F 3/016; G06F 3/16
See application file for complete search history.

(56) References Cited

U.S. PATENT DOCUMENTS

| 2011/0320204 A1* | 12/2011 | Locker | G06F 3/0416 |
| | | | 704/E13.011 |
| 2014/0176472 A1* | 6/2014 | Lin | G06F 3/041 |
| | | | 345/173 |
| 2014/0354553 A1* | 12/2014 | Dai | G06F 3/044 |
| | | | 345/173 |
| 2017/0285774 A1* | 10/2017 | Parikh | G06F 3/167 |

FOREIGN PATENT DOCUMENTS

| JP | H05184000 A | 7/1993 |
| JP | 2017537395 A | 12/2017 |
| JP | 2022067618 A | 5/2022 |
| JP | 2023184069 A | 12/2023 |
| WO | 2011041535 A1 | 4/2011 |

* cited by examiner

*Primary Examiner* — Patrick N Edouard
*Assistant Examiner* — Joseph P Fox
(74) *Attorney, Agent, or Firm* — Osha Bergman Watanabe & Burton LLP

(57) ABSTRACT

An input device control system includes: a vibration control unit which is configured to vibrate a pen-shaped input device by using writing sound data so as to generate writing sounds in accordance with detection of a state that the pen-shaped input device is in contact with an operational object surface; and a correction unit which is configured to execute processing which relates to change of a frequency characteristic of the writing sound data in such a manner that a frequency characteristic of real writing sounds which are generated in accordance with vibrations of the pen-shaped input device by the vibration control unit is corrected to a frequency characteristic of ideal writing sounds.

4 Claims, 9 Drawing Sheets

INPUT DEVICE CONTROL SYSTEM AND INPUT DEVICE CONTROLLING METHOD

CROSS-REFERENCE TO RELATED APPLICATIONS

This application claims priority to Japanese Patent Application No. 2023-115125 filed on Jul. 13, 2023, the contents of which are hereby incorporated herein by reference in their entirety.

TECHNICAL FIELD

The present invention relates to an input device control system and an input device controlling method.

BACKGROUND

In inputting into an interactive-type display system, it is known to use a pen-like stylus (a pen-shaped input device) which makes touch sense feedback possible by generating vibrations by driving a touch sense actuator as an input device.
Patent Document 1
Japanese Patent Application Publication No. 2017-537395
Since vibrations are generated from the pen-shaped input device and thereby it becomes possible to obtain the touch sense which is felt when sliding the nib on a writing medium such as paper, simulatively, it becomes possible for a user who performs an inputting operation by using the pen-shaped input device to obtain the touch sense which is close to a touch sense which is felt when performing a writing operation on the writing medium.

With regard to an inputting operation which is performed by using the pen-shaped input device, there exists such an aspect that it is preferable that the touch sense be close to a touch sense which is obtained when performing the writing operation on a real writing medium as much as possible.

SUMMARY

One or more embodiments of the present invention approaches the touch sense which is obtained when actually performing the writing operation on the writing medium on the occasion of performing the inputting operation by using the pen-shaped input device.

According to one or more embodiments of the present invention, there is provided an input device control system which includes a vibration control unit which is configured to vibrate a pen-shaped input device by using writing sound data so as to generate writing sounds in accordance with detection of a state that the pen-shaped input device is in contact with an operational object surface and a correction unit which is configured to execute processing which relates to change of a frequency characteristic of the writing sound data in such a manner that a frequency characteristic of real writing sounds which are generated in accordance with vibrations of the pen-shaped input device by the vibration control unit is corrected to a frequency characteristic of ideal writing sounds.

According to one or more embodiments of the present invention, there is provided an input device controlling method which is used in the input device control system and includes the vibration control step that a vibration control unit makes a pen-shaped input device vibrate by using writing sound data in such a manner that writing sounds are generated depending on detection of a state that the pen-shaped input device is in contact with an operational object surface and the correction step that a correction unit executes processing which relates to change of a frequency characteristic of writing sound data in such a manner that a frequency characteristic of real writing sounds which are generated in accordance with the vibrations of the pen-shaped input device in the vibration control step is corrected to a frequency characteristic of ideal writing sounds.

According to the present invention, when performing the inputting operation by using the pen-shaped input device, such an effect that it becomes possible to get closer to the touch sense which is obtained when actually performing the writing operation on the writing medium is obtained.

DETAILED DESCRIPTION

First Embodiment

Figure 1:
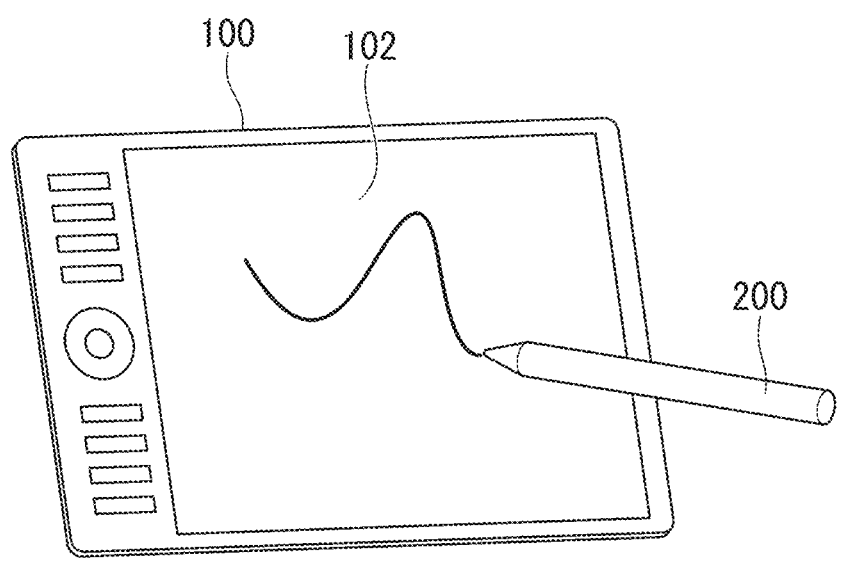
FIG. 1 is a diagram illustrating one example of an external configuration of an information processing system in one or more embodiments.

FIG. 1 illustrates one example of an external configuration of an information processing system according to one or more embodiments. As illustrated in FIG. 1, the information processing system according to one or more embodiments has an information processing device 100 and a pen-shaped input device 200.

The information processing device 100 is configured to be able to execute information processing in accordance with an inputting operation which is performed by the pen-shaped input device 200. FIG. 1 illustrates one example that the information processing device 100 is configured as a tablet terminal, a laptop PC or the like.

The information processing device 100 includes a touch panel display unit 102. The touch panel display unit 102 is a unit that a touch panel is combined with a display section. The touch panel display unit 102 displays an image on a display surface and makes it possible to perform an operation which is attained by bringing operating bodies such as the pen-shaped input device, a finger into contact with the display surface. Incidentally, in one or more embodiments, "the contact" may also include a state that the touch panel display unit 102 is able to detect the operating bodies thanks to presence of the operating bodies within a certain distance even in a case where the operating bodies are not in contact with the touch panel display unit 102 physically.

The pen-shaped input device 200 is a pen-type input device that a user uses for performing an operation to a touch panel on the touch panel display unit 102 of the information processing device 100. The user grips the pen-shaped input device 200, so moves the nib as to be brought into contact with the display surface of the touch panel display unit 102 and thereby performs an operation of inputting characters/letters, pictures, graphics and so forth by handwriting.

Incidentally, as operations which are performed by using the pen-shaped input device 200, also a pointing operation and other operations to a user interface image which is displayed on the touch panel display unit 102 may be made also possible.

Incidentally, although there is no particular limitation on a detection scheme of the pen-shaped input device 200 by the touch panel on the touch panel display unit 102 in one or more embodiments, for example, an electrostatic capacitive system, an electromagnetic induction system and so forth may be given. In the following description, a case where the electrostatic capacitive system is used will be given by way of example.

An application (a pen operation adaptive application) which is adaptive to an inputting operation which is performed by the pen-shaped input device 200 is installed in the information processing device 100.

The pen operation adaptive application may make it possible to execute various kinds of processing such as processing of inputting letters/characters which is performed by bringing the nib of the pen-shaped input device 200 into contact with the touch panel display unit 102, processing of displaying the letters/characters and pictures which are written/drawn in accordance with a handwriting inputting operation such as picture drawing on the touch panel display unit 102, processing of digitalizing the letters/characters and the pictures which are written/drawn by the operations.

In addition, in the information processing system of one or more embodiments, the pen-shaped input device 200 so vibrates as to generate writing sounds correspondingly to a situation that an operation (a writing operation) which accords with writing is being performed. Owing to generation of the writing sounds from the pen-shaped input device 200 in this way, it becomes possible for the user to feel a sense which is close a sense which is obtained when the user is performing the writing operation on a writing medium such as paper.

In the following description, generation of the writing sounds which accords with the situation that the writing operation is being performed by using the pen-shaped input device 200 will be also called "writing sound feedback".

Figure 2:
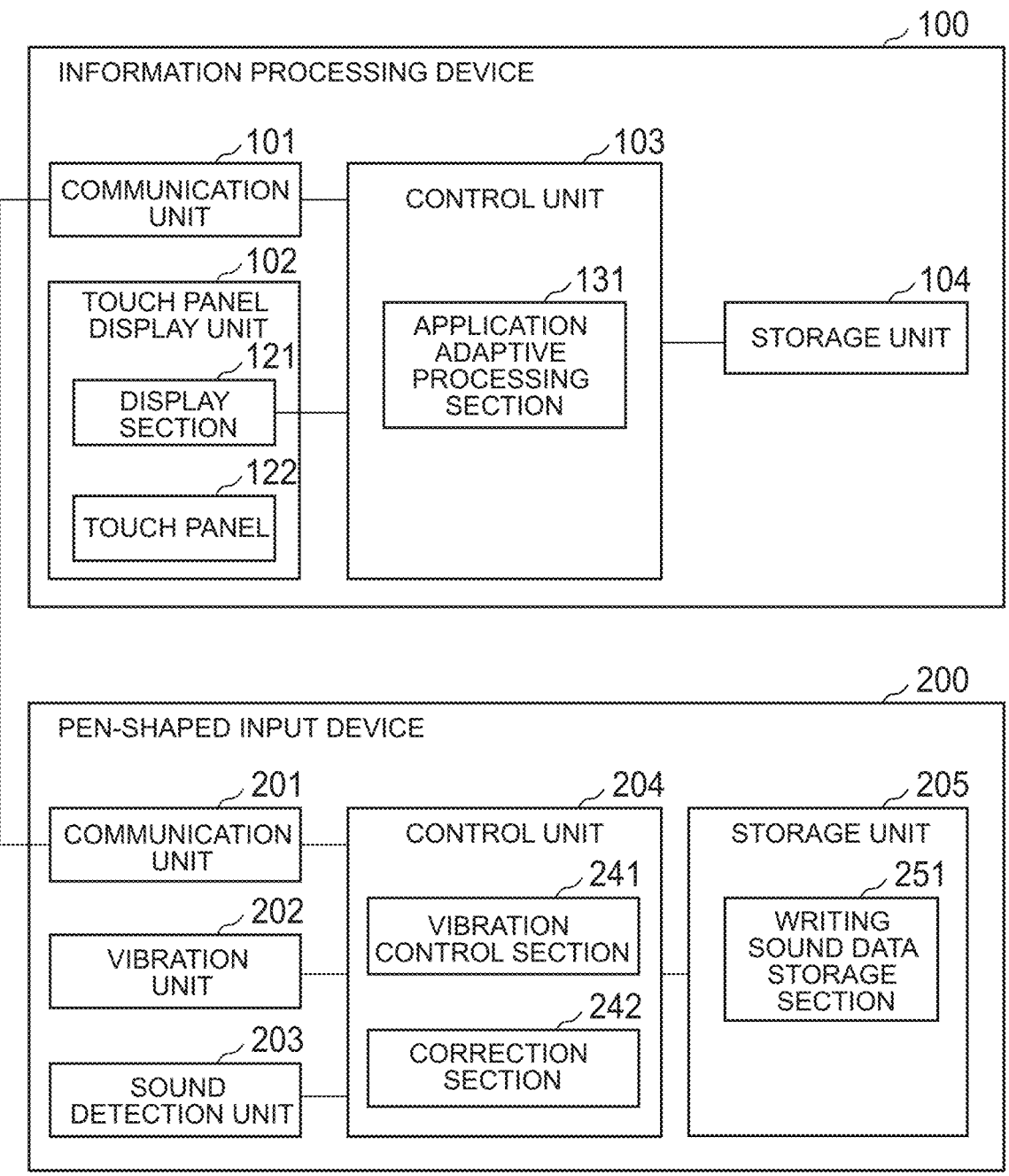
FIG. 2 is a diagram illustrating examples of functional configurations of an information processing device and a pen-shaped input device in one or more embodiments which comply with writing sound feedback.

FIG. 2 illustrates the examples of the functional configurations of the information processing device 100 and the pen-shaped input device 200 which accord with the writing sound feedback in one or more embodiments.

First, the example of the functional configuration of the information processing device 100 will be described. A CPU (Central Processing Unit), a GPU (Graphics Processing Unit) and so forth that the information processing device 100 includes as hardware execute a program and thereby the function of the information processing device 100 which is illustrated in FIG. 2 is realized.

The information processing device 100 in FIG. 2 includes a communication unit 101, a touch panel display unit 102, a control unit 103 and a storage unit 104.

The communication unit 101 performs wireless communication with the pen-shaped input device 200. There is no particular limitation on the system of the wireless communication that the communication unit 101 deals with. Incidentally, the communication unit 101 may be also configured to make it possible to deal with wired communication with the pen-shaped input device 200.

The touch panel display unit 102 is a device that a display section 121 is combined with a touch panel 122 (one example of a sensor section).

The display section 121 displays images in accordance with control by the control unit 103.

The touch panel 122 is installed correspondingly to a display surface of the display section 121, detects the position of the nib of the pen-shaped-input device 200 and outputs coordinates of the detected position as pen position information. Specifically, the touch panel 122 of the electrostatic capacitive system may detect the position (the coordinates) of the nib on the panel surface by detecting the capacity of static electricity which is generated by contact of the nib of the pen-shaped input device 200 with the panel surface (one example of an operational object surface) by an electrode.

The control unit 103 executes various kinds of controlling operations in the information processing device 100. The control unit 103 includes an application-adaptive processing section 131 which executes processing which adapts to the pen operation adaptive application.

In a case where a writing operation is being performed by using the pen-shaped input device 200 as an operation which is adaptive to the pen operation-adaptive application, the pen position information is input into the application-adaptive processing section 131 via the touch panel 122. The application-adaptive processing section 131 performs processing such as drawing in accordance with input of the pen position information.

The storage unit 104 stores various information which corresponds to the information processing device 100.

Next, the example of the functional configuration of the pen-shaped input device 200 will be described. The function of the pen-shaped input device 200 which is illustrated in FIG. 2 may be realized by making a microprocessor such as an MCU (Micro Controller Unit) that the pen-shaped input device 200 includes as hardware execute a program.

The pen-shaped input device 200 in FIG. 2 includes a communication unit, a vibration unit 202, a sound detection unit 203, a control unit 204 and a storage unit 205.

The communication unit 201 is connected with the communication unit 101 of the information processing device 100 to be communicable.

The vibration unit 202 (an actuator) is a unit which vibrates in such a manner that the writing sounds are generated when the user who grips the pen-shaped input device 200 is performing the writing operation. The vibration of the vibration unit 202 is controlled by a vibration control section 241.

The sound detection unit 203 detects (picks up) the writing sounds which are generated from the pen-shaped input device 200. Frequency analysis is performed on the writing sounds which are detected by the sound detection unit 203. Although there is no particular limitation on the structure and so forth of the sound detection unit 203, it is preferable that the sound detection unit 203 be configured by a microphone, a piezoelectric sensor and so forth.

The control unit 204 executes various kinds of controlling operations in the pen-shaped input device 200. The control unit 204 includes a vibration control section 241 and a correction section 242.

The vibration control section 241 makes the vibration unit 202 vibrate on the basis of a waveform that writing sound data that a writing sound data storage section 251 stores indicates.

The correction section 242 executes processing which relates to change of the frequency characteristic of the writing sound data in such a manner that the frequency characteristic of real writing sounds is corrected to the frequency characteristic of ideal writing sounds. The real writing sounds are writing sounds which are actually generated in accordance with vibrations of the pen-shaped input device 200 by the vibration control section 241. The ideal writing sounds are writing sounds which are to be originally generated.

For example, the writing sound data that the writing sound data storage section 251 stores has a frequency characteristic which corresponds to the frequency characteristic of the ideal writing sounds. However, there are cases where the real writing sounds which are actually generated from the pen-shaped input device 200 diverge from the ideal writing sounds, for example, depending on conditions of the material quality, the structure, the weight and so forth of the touch panel 122 with which the pen-shaped input device 200 is brought into contact and on conditions of the material quality, the structure, the weight and so forth of the pen-shaped input device 200 itself. It becomes difficult for the user to learn the touch sense of actually performing the writing operation on a writing medium due to a difference between the real writing sounds and the ideal writing sounds in this way.

Accordingly, the correction section 242 in one or more embodiments corrects the writing sound data that the vibration control section 241 utilizes in such a manner that the frequency characteristic of the real writing sounds that the sound detection unit 203 detects gets closer to the frequency characteristic of the ideal writing sounds. Corrections are made in this way and thereby it becomes possible for the user to hear the writing sounds which are close to ideal when the user is performing the writing operation by using the pen-shaped input device 200 and thereby it becomes possible for the user to feel the touch sense which is close to the touch sense which is felt when the user is actually performing the writing operation on the writing medium.

The storage unit 205 stores various kinds of information that the pen-shaped input device 200 deals with. The storage unit 205 includes the writing sound data storage section 251.

The writing sound data storage section 251 stores writing sound data. The writing sound data is data which indicates a waveform for vibrating in such a manner that the pen-shaped input device 200 generates the writing sounds.

The examples of processing procedures that the information processing device 100 and the pen-shaped input device 200 in one or more embodiments execute correspondingly to the writing sound feedback will be described with reference to the flowcharts in FIG. 3.

First, the example of the processing procedures that the information processing device 100 executes will be described.

Step S100: In the information processing device 100, an application adaptive processing section 131 stands by for start of the writing operation.

The application adaptive processing section 131 may detect that the writing operation is started in accordance with, for example, start of inputting of pen position information which indicates the nib position from the touch panel 122.

Step S102: The application adaptive processing section 131 starts transmission of writing operation information to the pen-shaped input device 200 in response to start of the writing operation. The writing operation information is information for notifying that the writing operation is being currently performed on the touch panel 122 with the use of the pen-shaped input device 200.

Step 104: After start of transmission of the writing operation information in the step S102, the application adaptive processing section 131 stands by for termination of the writing operation which is started in the step S100. The application adaptive processing section 131 may decide that the writing operation is terminated in accordance with a situation that the pen position information which has been input so far is not input.

Step S106: In a case where it is decided that the writing operation is terminated in the step S104, the application adaptive processing section 131 stops transmission of the writing operation information which is started in the step S102.

Next, the example of processing procedures that the pen-shaped input device 200 executes will be described.

Step S200: In the pen-shaped input device 200, the vibration control section 241 stands by for start of reception of the writing operation information which is transmitted from the information processing device 100 in the step S102.

Step S202: In response to start of reception of the writing operation information in the step S100, the sound detection unit 203 detects the real writing sounds. The correction section 242 acquires data (the real writing sound data) on the real writing sounds that the sound detection unit 203 detects. The correction section 242 may acquire the real writing sound data on the real writing sounds that the sound detection unit 203 detects for a predetermined period of time (the predetermined number of samples).

Step S204: The correction section 242 generates correction data which is used for correcting in such a manner that the real writing sounds get close to the ideal writing sounds. In generation of the correction data, the correction section 242 calculates the frequency characteristic of the real writing sounds, for example, by performing frequency analysis of the real writing sound data which is acquired in the step S202. The correction section 242 calculates a difference between the frequency characteristic of the real writing sounds and the frequency characteristic of the writing sound data that the writing sound data storage section 251 stores (that is, the frequency characteristic of the ideal writing sounds). The correction section 242 generates correction data which is used for correcting the frequency characteristic of the real writing sounds to the frequency characteristic of the writing sound data on the basis of the difference which is calculated.

The correction data may be parameters of a filter, an equalizer and so forth which change the frequency characteristic of the writing sound data that, for example, the writing sound data storage section 251 stores. Alternatively, the correction data may be functional modules which function as the filter, the equalizer and so forth. Alternatively, the correction data may be writing sound data (corrected writing sound data) which has a frequency characteristic which is so set as to become the ideal writing sounds when generated as the real writing sounds. In addition, the correction data which is used as the parameters or the functional modules of the filter and the equalizer such as the above may be prepared in such a manner that, for example, a plurality of pieces of correction data of different types may be prepared by being stored into the storage unit 205 and so on and then the correction section 242 may select one piece of data from within the plurality of pieces of correction data on the basis of the difference which is calculated.

In the following description, a case where the correction data which serves as the module of the filter is generated will be given by way of example.

Step S206: The correction section 242 corrects the frequency characteristic of the writing sound data which is read out from the writing sound data storage section 251 on the basis of the correction data which is generated in the step S204. That is, in this case, the correction section 242 generates the module of the filter which serves as the correction data which is generated in the step S204 and makes the writing sound data which is read out from the writing sound data storage section 251 pass through the filter which is generated. The correction section 242 makes the writing sound data (the corrected writing sound data) which is corrected by being passed through the filter input into the vibration control section 241.

Step S208: The vibration control section 241 drives the vibration unit 202 on the basis of the writing sound data (the corrected writing sound data) which is input in the step S206. The vibration unit 202 is driven on the basis of the corrected writing sound data in this way and thereby the pen-shaped input device 200 on which the writing operation is being performed vibrates and then the real writing sounds which are brought closer to the ideal writing sounds are generated.

Step S210: In a case where the vibration control section 241 vibrates the vibration unit 202 in the step S208, the vibration control section 241 decides whether reception of the writing operation information which is transmitted from the information processing device 100 is stopped. In a case where it is decided that the reception of the writing operation information is not stopped, the process is returned to the step S208. The process is returned to the step S208 and thereby a state that the pen-shaped input device 200 vibrates is maintained on the basis of the corrected writing sound data in a state that the writing operation information is received.

Figure 3:
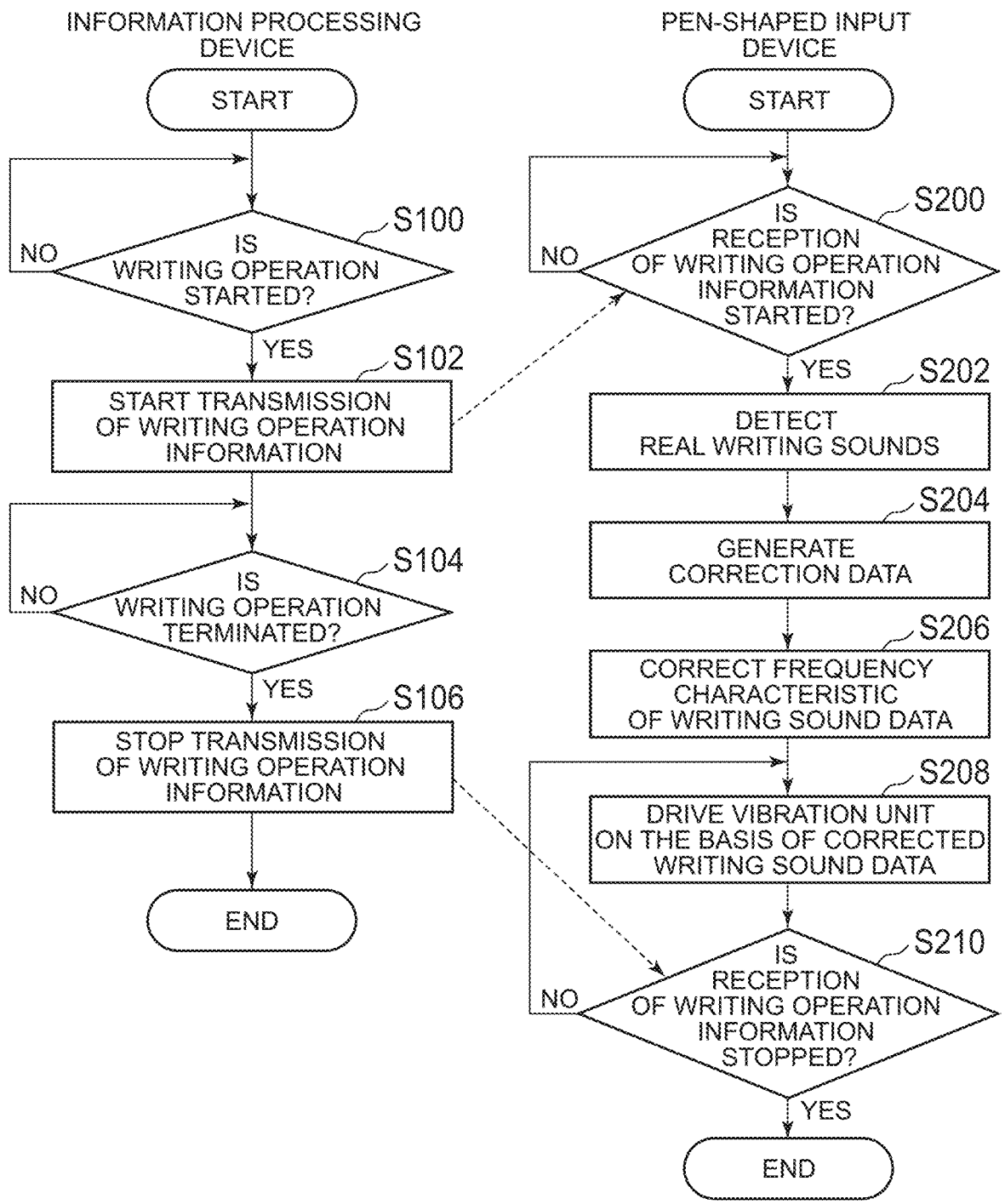
FIG. 3 is flowcharts respectively illustrating examples of processing procedures that the information processing device and the pen-shaped input device in one or more embodiments execute correspondingly to the writing sound feedback.

In a case where it is decided that reception of the writing operation information is stopped in the step S210, execution of the processing in FIG. 3 is terminated. Also, the vibration of the pen-shaped input device 200 is stopped in accordance with termination of the processing in this way.

Incidentally, in a case where the correction section 242 is configured to generate the corrected writing sound data as the correction data, the vibration control section 241 may skip the process in the step S206 and may drive the vibration unit 202 by utilizing the corrected writing sound data which is generated as the correction data in the step S208.

Incidentally, in one or more embodiments, feedback control may be performed in such a manner that while the writing operation is being performed, the real writing sounds are continuously detected so as to generate the correction data and to vibrate the vibration unit 202 on the basis of the writing sound data which is corrected on the basis of the correction data which is generated.

Second Embodiment

Then, the second embodiment will be described. The previously described information processing system according to one or more embodiments is configured to vibrate the pen-shaped input device 200 by utilizing the corrected writing sound data which is corrected on the basis of the difference between the real writing sounds which is detected by the sound detection unit 203 and the ideal writing sounds.

In contrast, in the information processing system according to one or more embodiments, the pen-shaped input device 200 is configured to store in advance the correction data which functions as the filter or the like which has a characteristic of making it possible to change the real writing sounds to the ideal writing sounds in accordance with a combination with the type (for example, the model number, the type) of the touch panel 122 which is to be operated. The pen-shaped input device 200 corrects the writing sound data by using the correction data which is set in correspondence with the type of the touch panel 122 which is to be operated and vibrates the vibration unit 202 by utilizing the corrected writing sound data. In one or more embodiments, the real writing sounds which are generated by the vibration of the pen-shaped input device 200 are brought closer to the ideal writing sounds in this way.

Figures 4, 5:
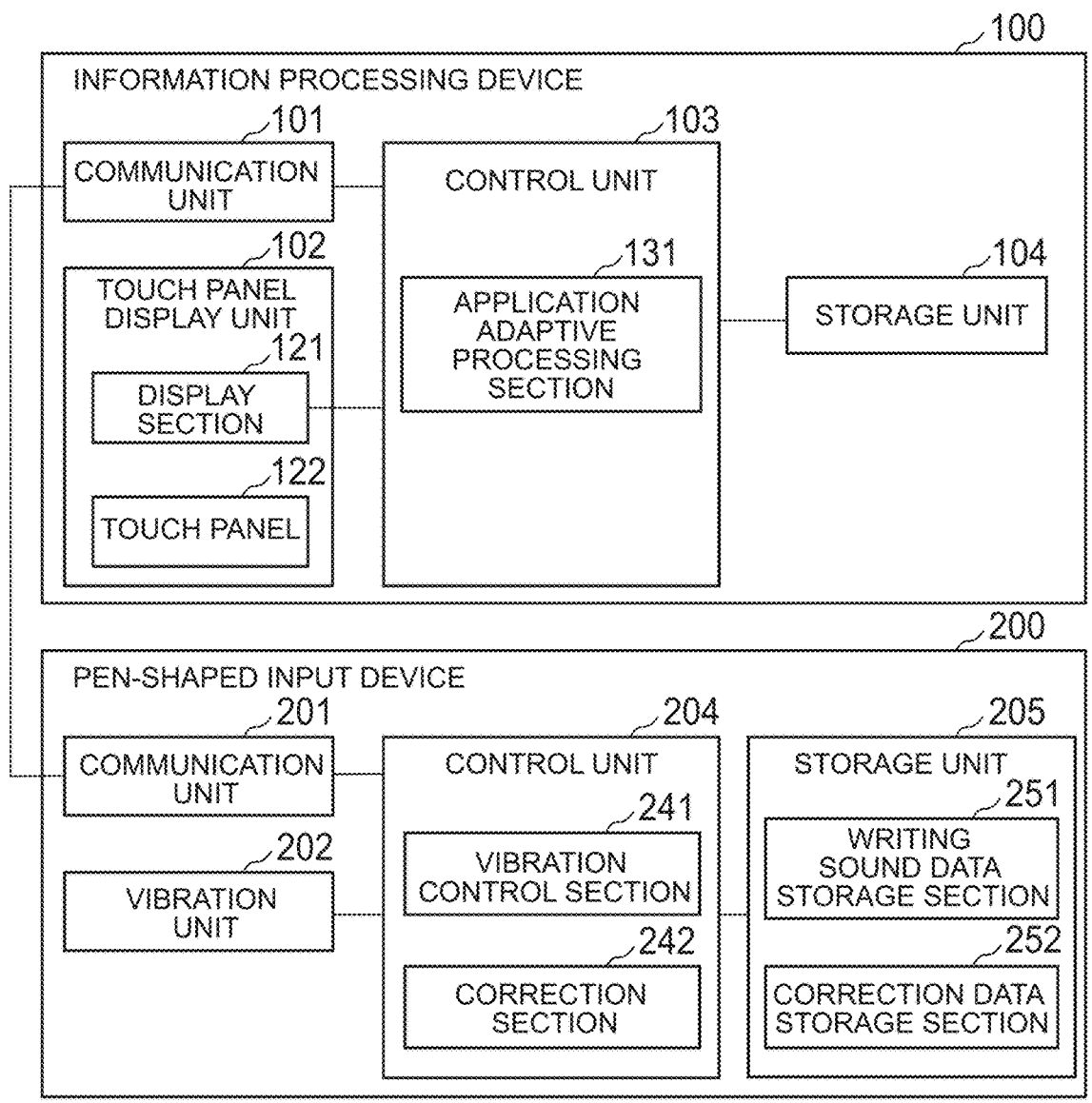
FIG. 4 is a diagram illustrating examples of functional configurations of an information processing device and a pen-shaped input device in one or more embodiments which comply with the writing sound feedback.
FIG. 5 is a diagram illustrating one example of correction data in one or more embodiments.

FIG. 4 illustrates the examples of the functional configurations of the information processing device 100 and the pen-shaped input device 200 which comply with the writing sound feedback of one or more embodiments. In FIG. 4, the same symbols are assigned to the parts which are the same as those in FIG. FIG. 2 and description thereof will be appropriately omitted.

In the pen-shaped input device 200 in FIG. 4, the storage unit 205 includes a correction data storage section 252. The correction data storage section 252 stores correction data which corresponds to each type of the touch panel 122.

In addition, in one or more embodiments, the sound detection unit 203 may be omitted.

FIG. 5 illustrates one example of the correction data that the correction data storage section 252 stores. As illustrated in FIG. 5, the correction data storage section 252 stores the correction data in one-to-one correspondence with each touch panel type. The correction data which corresponds to one touch panel type is data which is used to correct the frequency characteristic of the writing sound data that the writing sound data storage section 251 stores in such a manner that the real writing sounds get closer to the ideal writing sounds, coping with a case where the writing operation which uses the pen-shaped input device 200 is performed on the touch panel of the touch panel type which corresponds thereto. That is, the correction data storage section 252 stores correction data which corresponds to each combination with each of various touch panel types which are set for the pen-shaped input device 200.

The correction data in one or more embodiments may be the parameters of the filter, the equalizer and so forth. Alternatively, the correction data may be the function modules which function as the filter, the equalizer and so forth. In addition, the correction data which is set as the parameters or the functional modules of the filter, the equalizer and so forth which are described above may be prepared in such a manner that, for example, a plurality of pieces of data of different types is prepared in advance in a state of being stored into the storage unit 205 or the like and then the correction section 242 may select one piece of correction data from within the plurality of pieces of correction data on the basis of the difference which is calculated.

The examples of the processing procedures that the information processing device 100 and the pen-shaped input device 200 in one or more embodiments execute correspondingly to the writing sound feedback will be described with reference to the flowcharts in FIG. 6.

First, the example of the processing procedure that the information processing device 100 executes will be described.

Step S300: In the information processing device 100, the application adaptive processing section 131 stands by for start of the writing operation.

Step S302: In accordance with start of the writing operation, the application adaptive processing section 131 starts transmission of writing operation information to the pen-shaped input device 200. Type information which indicates the type (touch panel type) of the touch panel 122 that the information processing device 100 includes is contained in the writing operation information in one or more embodiments. For example, the type information which indicates the type of the touch panel 122 is stored in the storage unit 104. The application adaptive processing section 131 may be configured to contain the type information which is acquired from the storage unit 104 in the writing operation information.

Step S304: After start of transmission of the writing operation information in the step S302, the application adaptive processing section 131 stands by for termination of the writing operation which is started in the step S300.

Step S306: In a case where it is decided that the writing operation is terminated in the step S304, the application adaptive processing section 131 stops transmission of the writing operation information which is started in the step S302.

Next, the example of the processing procedures that the pen-shaped input device 200 executes will be described.

Step S400: In the pen-shaped input device 200, the vibration control section 241 stands by for start of reception of the writing operation information which is transmitted from the information processing device 100 in the step S302.

Step S402: The correction section 242 acquires type information which is contained in the writing operation information which is received in accordance with start of reception of the writing operation information in the step S400.

Step S404: The correction section 242 acquires the correction data which is set in one-to-one correspondence with each touch panel type and which is the same as the correction data that the type information which is acquired in the step S402 indicates from the correction data storage section 252.

Step S406: The correction section 242 corrects the frequency characteristic of the writing sound data which is read out of the writing sound data storage section 251 on the basis of the correction data which is acquired in the step S404. The correction section 242 makes the writing sound data which is corrected (the corrected writing sound data) input into the vibration control section 241.

Step S408: The vibration control section 241 makes the vibration unit 202 vibrate on the basis of the writing sound data (the corrected writing sound data) which is input in the step S406.

Step S410: In a case where the vibration unit 202 is controlled to vibrate in the step S408, the vibration control section 241 decides whether reception of the writing operation information which is transmitted from the information processing device 100 is stopped. In a case where it is decided that the reception of the writing operation information is not stopped, the process is returned to the step S408.

Figure 6:
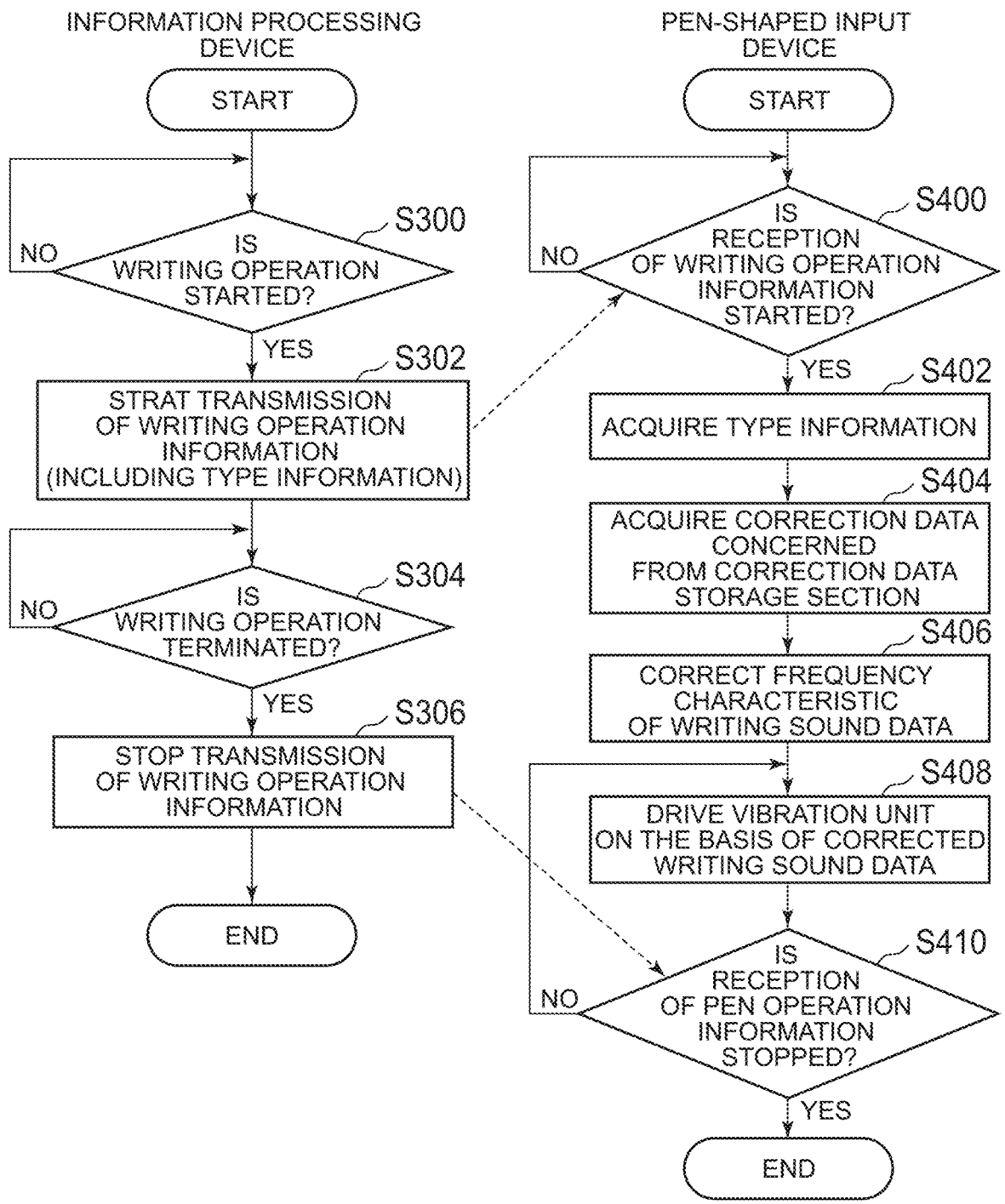
FIG. 6 is flowcharts respectively illustrating examples of processing procedures that the information processing device and the pen-shaped input device in one or more embodiments execute correspondingly to the writing sound feedback.

In a case where it is decided that the reception of the writing operation information is stopped in the step S410 concerned, execution of the processing in FIG. 6 is terminated. Also, the vibration of the pen-shaped input device 200 is stopped depending on termination of the processing in FIG. 6.

Incidentally, in one or more embodiments, each piece of the correction data that the correction data storage section 252 stores may be writing sound data which is set so as to have the frequency characteristic on the basis of which the real writing sounds become the ideal writing sounds in accordance with the writing operation for each corresponding touch panel type. In this case, the vibration control section 241 may make the vibration unit 202 vibrate on the basis of the writing sound data which serves as the correction data that the correction section 242 acquires. In addition, in this case, the writing sound data storage section 251 may be omitted.

Third Embodiment

Next, the third embodiment will be described. The first embodiment which is described above is configured in such a manner that the pen-shaped input device 200 detects the real writing sounds and corrects the writing sound data on the basis of the real writing sounds which are detected. In contrast, in one or more embodiments, the information processing device 100 is configured to detect the real writing sounds and to execute processing which relates to correction of the writing sound data on the basis of the real writing sounds which are detected. The pen-shaped input device 200 is configured to generate the real writing sounds which are brought closer to the ideal writing sounds by using the writing sound data which is corrected by the information processing device 100.

Figure 7:
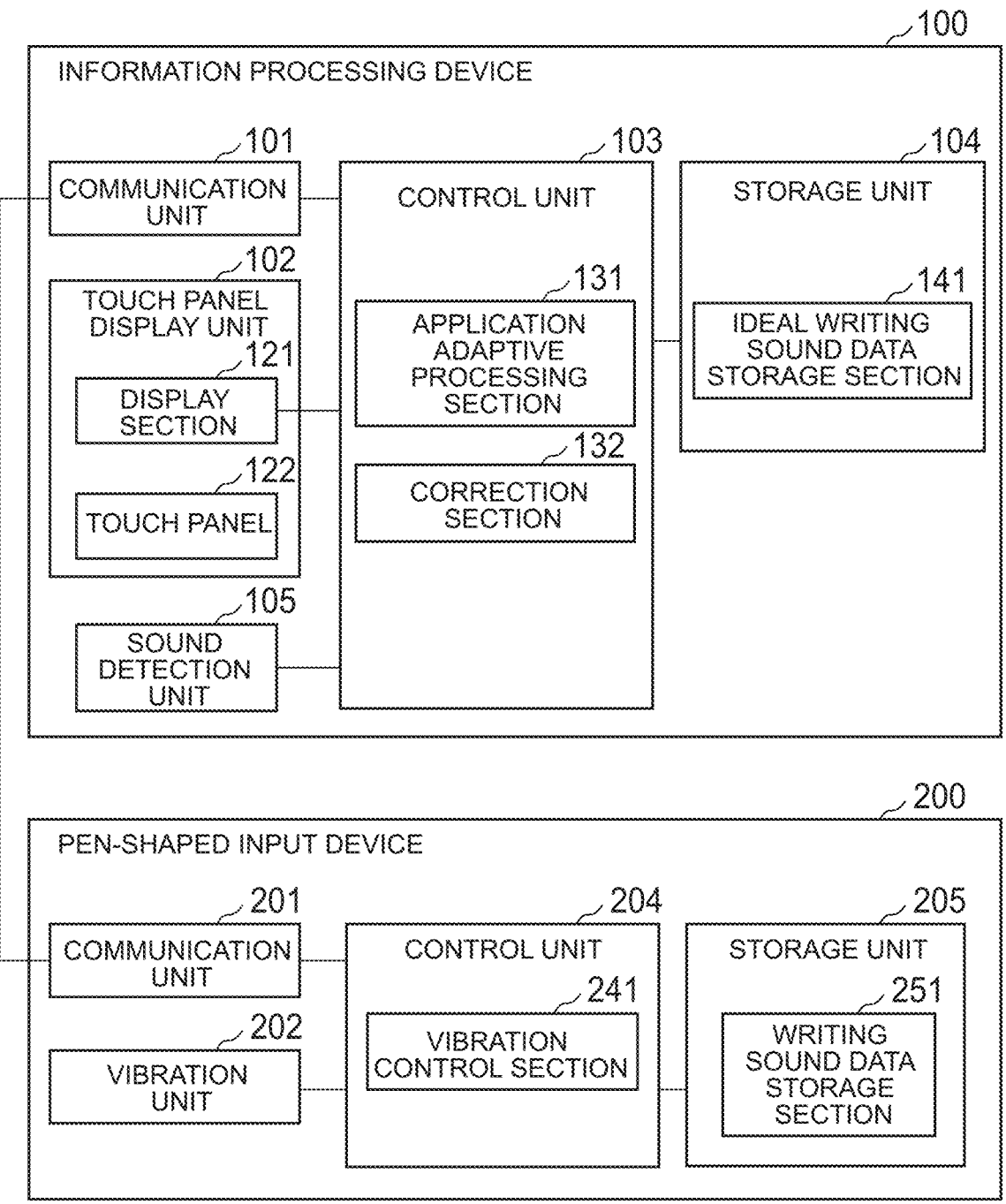
FIG. 7 is a diagram illustrating examples of functional configurations of an information processing device and a pen-shaped input device in one or more embodiments which comply with the writing sound feedback.

FIG. 7 illustrates the examples of the functional configurations of the information processing device 100 and the pen-shaped input device 200 which comply with the writing sound feedback of one or more embodiments. In FIG. 7, the same symbol is assigned to the part which is the same as the part in FIG. 1 and here points which are different from the points in FIG. 1 will be mainly described.

The information processing device 100 includes a sound detection unit 105 and a correction section 132.

The sound detection unit 105 is so installed as to make it possible to detect the writing sounds which are generated from the pen-shaped input device 200 in a case where the user is performing the writing operation by bringing the nib of the pen-shaped input device 200 into contact with the touch panel 122.

In addition, in FIG. 7, the sound detection unit 203 and the correction section 242 which are installed on the pen-shaped input device 200 in FIG. 1 are omitted. The correction section 132 in one or more embodiments may be provided either as one of functions that, for example, the pen operation adaptive application has or as a function of an OS (Operating System).

In addition, the storage unit 104 of the information processing device 100 includes an ideal writing sound data storage section 141. The ideal writing sound data storage section 141 stores the ideal writing sound data. The ideal writing sound data is writing sound data which corresponds to writing sounds which are to be generated correspondingly to, for example, the touch panel 122 that the information processing device 100 includes. The ideal writing sound data that the ideal writing sound storage section 141 stores may be of the kind which indicates the frequency characteristic of the ideal writing sounds which correspond thereto. In addition, the ideal writing sound data storage section 141 may store the ideal writing sound data correspondingly to each type of writing instrument which is selected, for example, under the pen operation adaptive application.

The examples of the processing procedures that the information processing device 100 and the pen-shaped input device in one or more embodiments execute correspondingly to the writing sound feedback will be described with reference to the flowcharts in FIG. 8.

Step S500: In the information processing device 100, the application adaptive processing section 131 stands by for start of the writing operation.

Step S502: The sound detection unit 105 detects the real writing sounds depending on start of the writing operation.

Step S504: The correction section 132 generates the correction data. For example, the correction section 132 calculates the frequency characteristic of the real writing sounds by performing frequency analysis of the real writing sounds (the real writing sound data) which are detected in the step S502. The correction section 132 also generates the correction data that the frequency characteristic of the real writing sounds is set to the frequency characteristic of the ideal writing sound data on the basis of a difference between the frequency characteristic of the real writing sounds and the frequency characteristic of the ideal writing sound data that the ideal writing sound data storage section 141 stores. The correction data in one or more embodiments may be the parameters of the filter, the equalizer and so forth. Alternatively, the correction data may be functional modules which function as the filter, the equalizer and so forth. In addition, the correction data which is set as the parameter or the functional module of the filter, the equalizer and so forth such as the above-described ones may be prepared in such a manner that, for example, the plurality of pieces of correction data of different types is prepared in advance in a state of being stored in the storage unit 205 or the like and then the correction section 242 may select one piece of data from within the plurality of pieces of correction data on the basis of the difference which is calculated.

Step S506: The correction section 132 starts transmission of the writing operation information and transmits the correction data which is generated in the step S504 at a timing that transmission of the writing operation information is started.

Step S508: After start of the transmission of the writing operation information in the step S506, the application adaptive processing section 131 stands by for termination of the writing operation which is started in the step S500.

Step S510: In a case where it is decided that the writing operation is terminated in the step S508, the application adaptive processing section 131 stops transmission of the writing operation information which is started in the step S506.

Next, the example of the processing procedures that the pen-shaped input device 200 executes will be described.

Step S600: In the pen-shaped input device 200, the vibration control section 241 stands by for start of reception of the writing operation information which is transmitted from the information processing device 100 in the step S506.

Step S602: The vibration control section 241 sets a filter which is based on the correction data which is received at a timing which is the same as the timing that reception of the writing operation information is started.

Step S604: The vibration control section 241 obtains corrected writing sound data by making the writing sound data that the writing sound data storage section 251 stores pass through the filter which is set in the step S602 and then makes the vibration unit 202 vibrate on the basis of the corrected writing sound data.

Step S606: In a situation that the vibration control section 241 makes the vibration unit 202 vibrate in the step S604, the vibration control section 241 decides whether reception of the writing operation information which is transmitted from the information processing device 100 is stopped. In a case where it is decided that the reception of the writing operation information is not stopped, the process is returned to the step S604.

Figure 8:
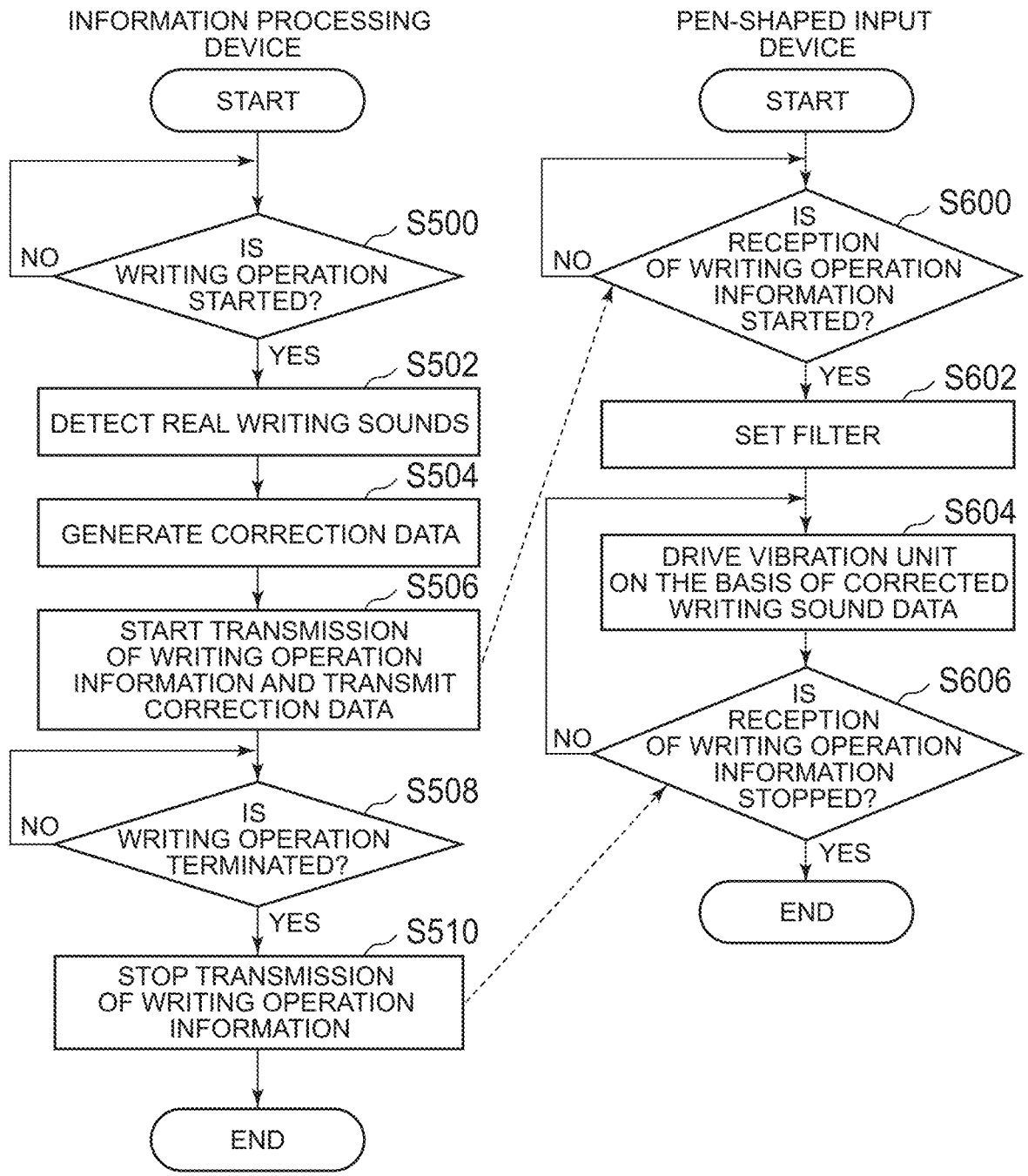
FIG. 8 is flowcharts respectively illustrating examples of processing procedures that the information processing device and the pen-shaped input device in one or more embodiments execute correspondingly to the writing sound feedback.

In a case where it is decided that the reception of the writing operation information is stopped in the step S606, execution of the processing in FIG. 8 is terminated and also the vibrations of the pen-shaped input device 200 are stopped.

Incidentally, in one or more embodiments, the correction section 132 of the information processing device 100 may transmit the ideal writing sound data that the ideal writing sound data storage section 141 stores to the pen-shaped input device 200 as the correction data. In this case, the vibration control section 241 of the pen-shaped input device 200 may be so operated as to make the vibration unit 202 vibrate on the basis of the ideal writing sound data which serves as the correction data which is received. In addition, in this case, the writing sound data storage section 251 which is installed in the pen-shaped input device 200 may be omitted.

Fourth Embodiment

Then, the fourth embodiment will be described. In the previously described second embodiment, the pen-shaped input device 200 is configured to correct the writing sound data on the basis of the correction data which complies with the type of the touch panel 122 and then to vibrate the vibration unit 202 on the basis of the writing sound data which is corrected.

In contrast, in one or more embodiments, the information processing device 100 is configured to store the correction data which is set in one-to-one correspondence with each type (the pen type) of the pen-shaped input device 200. The information processing device 100 transmits the correction data which corresponds to the pen type of the pen-shaped input device 200 which is used in a writing operation which is performed on the touch panel 122 in the correction data which is stored to the pen-shaped input device 200. The pen type corresponds to the model and so forth of the pen-shaped input device 200.

The pen-shaped input device 200 is configured to generate the real writing sounds which are gotten closer to the ideal writing sounds by vibrating the vibration unit 202 by using the writing sound data (the corrected writing sound data) which is corrected on the basis of the correction data which is received.

Figure 9:
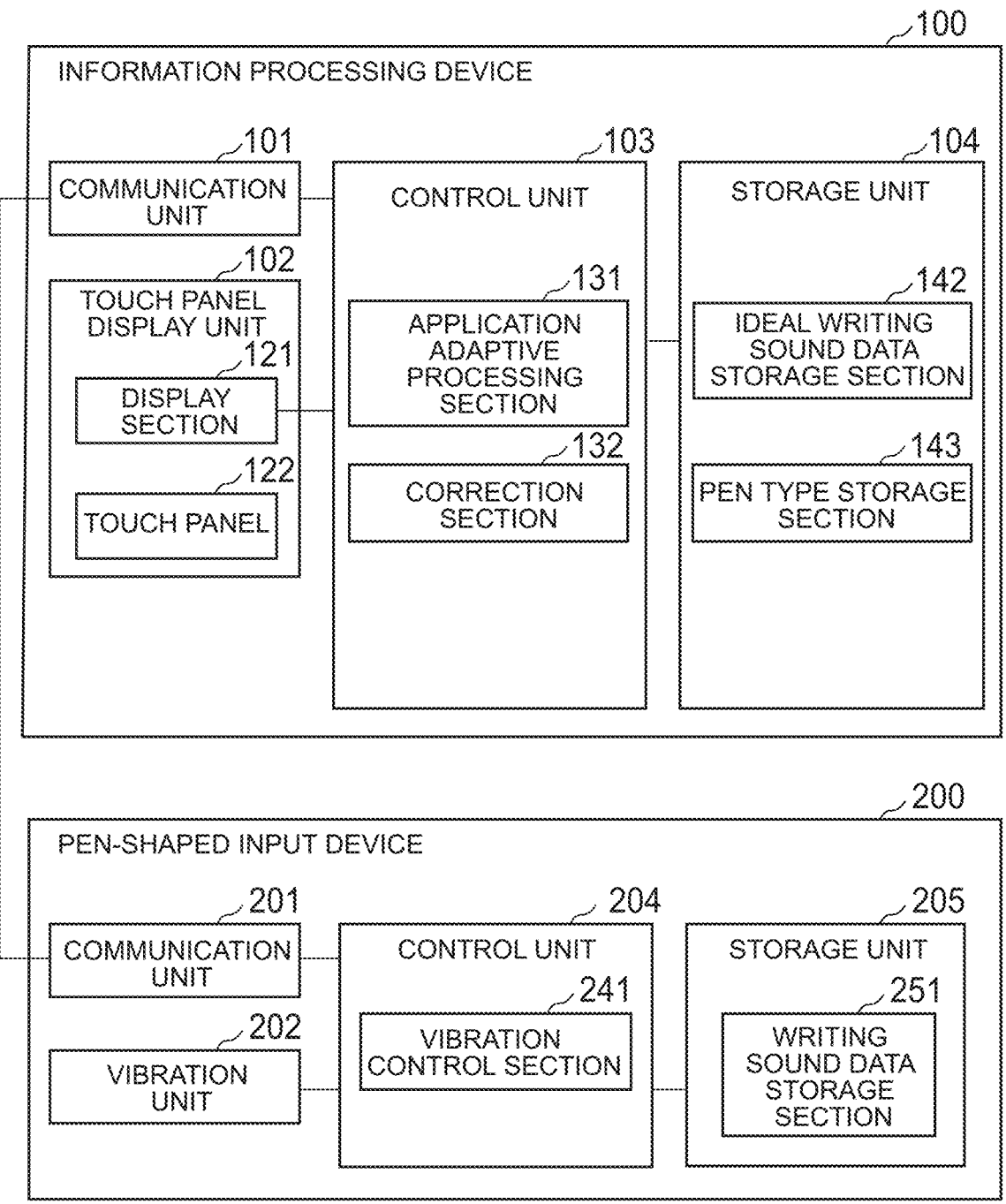
FIG. 9 is a diagram illustrating examples of functional configurations of an information processing device and a pen-shaped input device in one or more embodiments which comply with the writing sound feedback.

FIG. 9 illustrates the examples of the functional configurations of the information processing device 100 and the pen-shaped input device 200 which comply with the writing sound feedback in one or more embodiments. In FIG. 9, the same symbols are assigned to the parts which are the same as the parts in FIG. 4 and description thereof will be omitted appropriately.

The information processing device 100 in FIG. 9 includes the correction section 132 in the control unit 103. In addition, the information processing device 100 in FIG. 9 includes a correction data storage section 142 and a pen type storage section 143 in the storage unit 104.

In addition, in the pen-shaped input device 200 in FIG. 9, the correction section 242 and the correction data storage section 252 in FIG. 4 are omitted.

The correction data storage section 142 stores the correction data in one-to-one correspondence with each pen type. The correction data which corresponds to one pen type is data which is used to correct the writing sound data so as to obtain the ideal writing sounds when the writing operation is being performed on the touch panel 122 by the pen-shaped input device of the pen type which corresponds thereto. That is, the correction data storage section 142 stores the correction data which corresponds to each combination of each of the various pen-shaped input devices relative to the touch panel 122 that the information processing device 100 includes.

In addition, also in one or more embodiments, the correction data may be the parameters of the filter, the equalizer and so forth. Alternatively, the correction data may be the functional modules which function as the filter, the equalizer and so forth. In the following description, a case where the correction data is the functional module which functions as the filter and so forth will be given by way of example.

The pen type storage section 143 stores the pen type of the pen-shaped input device 200 which is connected thereto to be communicable.

On the occasion of a negotiation which is to be executed in preparation for establishing communication with the information processing device 100, the pen-shaped input device 200 is so negotiated as to notify the information processing device 100 of its own pen type. The pen type storage section 143 stores the pen type which is notified in this way.

Figure 10:
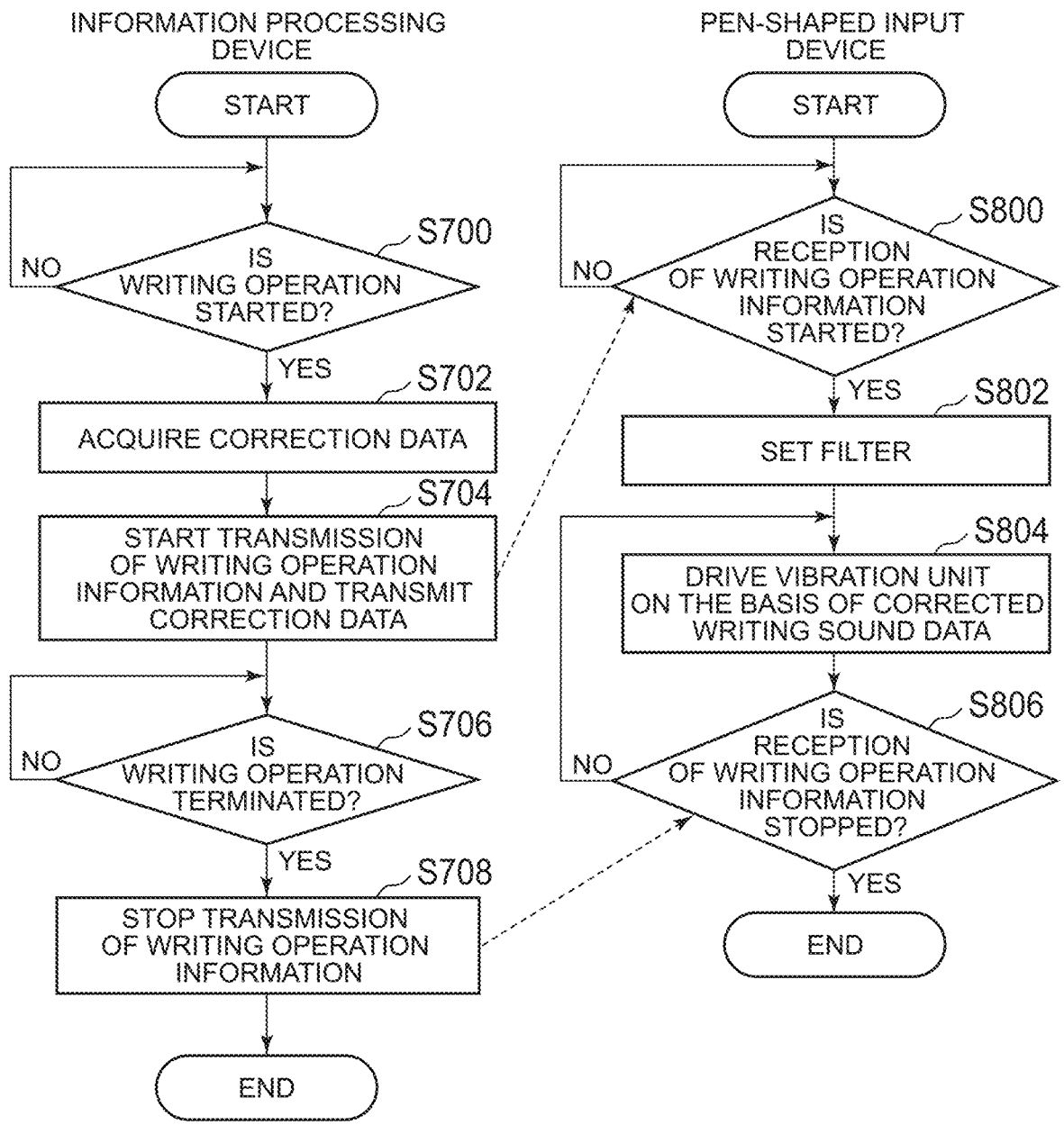
FIG. 10 is flowcharts respectively illustrating examples of processing procedures that the information processing device and the pen-shaped input device in one or more embodiments execute correspondingly to sending and receiving of a pen ID (identification).

The examples of the processing procedures that the information processing device 100 and the pen-shaped input device 200 in one or more embodiments execute correspondingly to the writing sound feedback will be described with reference to the flowcharts in FIG. 10. The processing procedures in FIG. 10 are executed in a state that communication between the information processing device 100 and the pen-shaped input device 200 has already been established and the pen type of the pen-shaped input device 200 which is the connection destination is stored in the pen type storage section 143.

Step S700: In the information processing device 100, the application adaptive processing section 131 stands by for start of the writing operation.

Step S702: The correction section 132 acquires correction data which is set in correspondence with the pen types which are the same as the pen types that the pen type storage section 143 currently stores from the correction data storage section 142 depending on start of the writing operation.

Step S704: The correction section 132 starts transmission of the writing operation information and transmits the correction data which is acquired in the step S702 at a timing that the transmission of the writing operation information is started.

Step S706: After start of the transmission of the writing operation information in the step S704, the application adaptive processing section 131 stands by for termination of the writing operation which is started in the step S700.

Step S708: In a case where it is decided that the execution of the writing operation is terminated in the step S706, the application adaptive processing section 131 stops transmission of the writing operation information which is started in the step S704.

Respective processes that the pen-shaped input device 200 executes in the steps S800 to S806 may be the same as those which are executed in the steps S600 to S606 in FIG. 8.

Incidentally, in one or more embodiments, the correction data that the correction data storage section 142 stores may be writing sound data which is prepared in such a manner that the real writing sounds become equivalent to the ideal writing sounds which correspond to each pen type of the pen-shaped input device 200. In this case, the vibration control section 241 of the pen-shaped input device 200 may be configured to drive the vibration unit 202 on the basis of the writing sound data which is received as the correction data.

Incidentally, processing that the above-described information processing device 100, the pen-shaped input device 200 and so forth are to perform may be also performed by recording a program for realizing the functions of the above-described information processing device 100, the pen-shaped input device 200 and so forth into a computer-readable recording medium, by reading the program which is recorded in this recording medium into a computer system and by executing the program. Here, "reading the program which is recorded in the recording medium into the computer system and executing the program" includes to install the program into the computer system. Here, "the computer system" shall include the OS and hardware such as peripherals. In addition, "the computer system" may include a plurality of computer devices which is connected together over a network which includes communication lines such as the Internet, a WAN (Wide Area Network), a LAN (Local Area Network), dedicated lines. In addition, "the computer-readable recording medium" refers to portable media such as a flexible disc, a photomagnetic disc, a ROM (Read Only Memory), a CD-ROM (Compact Disc-Read Only Memory)

and storage devices such as an HDD (Hard Disk Drive), an SSD (Solid State Drive) which are built in the computer system. The recording medium which stores the program in this way may be also a non-transitory recording medium such as the CD-ROM. In addition, also a recording medium which is installed on the inner side or the outer side which is accessible from a distribution server which is adapted to distribute the program is also included in the recording media. Codes of a program which is stored into the recording medium of the distribution server may be different from codes of a program of the format which is executable by a terminal device. That is, as long as the program is of the type which is capable of being downloaded from the distribution server and installed in the form of being executable by the terminal device, the format that the program is stored in the recording medium of the distribution server does not matter. Incidentally, configurations which are obtained by dividing one program into a plurality of programs, downloading the respective programs at mutually different timings and thereafter unifying the programs at the terminal device and distribution servers which distribute the respective programs which are so divided may be different from one another. Further, "the computer readable recording medium" shall also include the ones which hold a program for a definite period of time such as a server and a volatile memory (a RAM: Random Access Memory) which is installed in a computer system which serves as a client in a case where the program is transmitted over the network. In addition, the above-described program may be of the type which is used for realizing some of the above-described functions. Further, the program may be of the type which can realize the above-described functions by combination with a program which has already been recorded in the computer system, that is, may be a so-called differential file (a differential program).

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS 100 information processing device
101 communication unit
102 touch panel display unit
103 control unit
104 storage unit
105 sound detection unit
121 display section
122 touch panel
131 application adaptive processing section
132 correction section
141 ideal writing sound data storage section
142 correction data storage section
143 pen type storage section
200 pen-shaped input device
201 communication unit
202 vibration unit
203 sound detection unit
204 control unit
205 storage unit
241 vibration control section
242 correction section
251 writing sound data storage section
252 correction data storage section

What is claimed is:

1. An input device control system comprising:
   a storage unit configured to store writing sound data corresponding to predetermined writing sounds;
   a sensor configured to detect sounds generated by a pen-shaped input device; and
   a processor configured to:
      vibrate the pen-shaped input device by using the writing sound data so as to generate real writing sounds in accordance with detection of a state that the pen-shaped input device is in contact with an operational object surface;
      detect, using the sensor, the real writing sounds generated by the pen-shaped input device based on the writing sound data;
      obtain, based on frequency analysis on the real writing sounds, correction data that includes a parameter of an equalizer;
      read the writing sound data from the storage unit and change, based on the correction data, a frequency characteristic of the writing sound data using the equalizer configured by the parameter; and
      vibrate the pen-shaped input device based on an output of the equalizer to generate corrected writing sounds, wherein
   a frequency characteristic of the corrected writing sounds is closer, relative to the frequency characteristic of the real writing sounds, to a frequency characteristic of predetermined writing sounds.

2. The input device control system according to claim 1, where
   the storage unit is configured to store pieces of correction data corresponding to different type combinations of the pen-shaped input device and the operational object surface, wherein
   the processor obtains the correction data by selecting the correction data from the pieces of correction data stored in the storage unit based on a type of the pen-shaped input device and a type of the operational object surface.

3. The input device control system according to claim 1, wherein
   the parameter is based on a difference between the frequency characteristic of the predetermined writing sounds and the frequency characteristic of the real writing sounds.

4. An input device controlling method in an input device control system comprising:
   vibrating a pen-shaped input device by using writing sound data stored in a storage unit in such a manner that real writing sounds are generated depending on detection of a state that the pen-shaped input device is in contact with an operational object surface;
   detecting, using a sensor, the real writing sounds generated by the pen-shaped input device based on the writing sound data;
   obtain, based on frequency analysis on the real writing sounds, correction data that includes a parameter of an equalizer;
   reading the writing sound data from the storage unit and changing, based on the correction data, a frequency characteristic of the writing sound data using the equalizer configured by the parameter; and
   vibrating the pen-shaped input device based on an output of the equalizer to generate corrected writing sounds, wherein a frequency characteristic of the corrected writing sounds is closer, relative to the frequency characteristic of the real writing sounds, to a frequency characteristic of ideal predetermined writing sounds.

* * * * *